(12) United States Patent
Chehab et al.

(10) Patent No.: US 8,684,669 B2
(45) Date of Patent: Apr. 1, 2014

(54) TURBINE TIP CLEARANCE MEASUREMENT

(75) Inventors: Abdullatif M. Chehab, Oviedo, FL (US); Kevin L. Hines, Sorrento, FL (US); Barton M. Pepperman, Winter Springs, FL (US); Matthew D. Bogdan, Orlando, FL (US)

(73) Assignee: Siemens Energy, Inc., Orlando, FL (US)

( * ) Notice: Subject to any disclaimer, the term of this patent is extended or adjusted under 35 U.S.C. 154(b) by 508 days.

(21) Appl. No.: 13/027,354

(22) Filed: Feb. 15, 2011

(65) Prior Publication Data

US 2012/0207586 A1 Aug. 16, 2012

(51) Int. Cl.
*F01D 11/14* (2006.01)

(52) U.S. Cl.
USPC .......................................................... 415/118

(58) Field of Classification Search
USPC ................................. 415/173.1, 173.4, 174.4
See application file for complete search history.

(56) References Cited

U.S. PATENT DOCUMENTS

| | | | |
|---|---|---|---|
| 3,936,217 A * | 2/1976 | Travaglini et al. | 415/118 |
| 4,395,827 A | 8/1983 | Stowe et al. | |
| 4,419,044 A | 12/1983 | Barry et al. | |
| 4,876,505 A | 10/1989 | Osborne | |
| 5,649,369 A | 7/1997 | Thoren | |
| 6,148,518 A * | 11/2000 | Weiner et al. | 29/889.2 |
| 6,224,332 B1 | 5/2001 | Leach et al. | |
| 6,325,596 B1 | 12/2001 | Tomko | |
| 6,340,286 B1 * | 1/2002 | Aksit et al. | 415/173.3 |
| 6,499,944 B1 | 12/2002 | Beeck et al. | |
| 6,838,157 B2 | 1/2005 | Subramanian | |
| 6,848,193 B1 * | 2/2005 | Kirzhner | 33/833 |
| 6,935,836 B2 | 8/2005 | Ress, Jr. et al. | |
| 7,270,890 B2 * | 9/2007 | Sabol et al. | 428/632 |
| 7,572,524 B2 | 8/2009 | Sabol et al. | |
| 7,582,359 B2 | 9/2009 | Sabol et al. | |
| 7,618,712 B2 | 11/2009 | Sabol et al. | |
| 7,708,518 B2 | 5/2010 | Chehab | |
| 7,726,936 B2 | 6/2010 | Keller et al. | |
| 2003/0020496 A1 | 1/2003 | Eyraud et al. | |
| 2007/0285110 A1 | 12/2007 | Nigmatulin et al. | |
| 2009/0289620 A1 | 11/2009 | Suckling et al. | |

FOREIGN PATENT DOCUMENTS

| | | |
|---|---|---|
| EP | 0256790 A2 | 2/1988 |
| EP | 1113146 A2 | 7/2001 |
| EP | 2070689 A2 | 6/2009 |
| EP | 2230387 A2 | 9/2010 |
| FR | 2339741 | 8/1977 |
| GB | 2297162 A | 7/1996 |

OTHER PUBLICATIONS

Dupont; Vespel S Line; Typical Properties of Vespel Parts and Shapes; Jun. 2002.

* cited by examiner

*Primary Examiner* — Nathaniel Wiehe
*Assistant Examiner* — Kayla McCaffrey

(57) ABSTRACT

A measuring assembly for use in a gas turbine engine includes an indicia portion that extends radially inwardly from an inner surface of a ring seal structure to a location radially inwardly from tips of blades mounted on a rotor. The indicia portion of the measuring assembly comprises a section that is abraded by the blades during rotational movement of the rotor to provide a visual indication of a distance between the tips of the blades and the inner surface.

18 Claims, 6 Drawing Sheets

TURBINE TIP CLEARANCE MEASUREMENT

FIELD OF THE INVENTION

The present invention relates generally to a measuring assembly for use in a turbine engine, and more particularly, to a measuring assembly for determining a clearance between an inner surface of a seal structure in a turbine engine and tips of blades mounted to a rotor in the engine.

BACKGROUND OF THE INVENTION

Referring to FIG. 1, a turbine engine 10 is illustrated including a compressor section 12, a combustor section 14 and a turbine section 16. In the turbine section 16, there are alternating rows of stationary airfoils 18 (commonly referred to as vanes) and rotating airfoils 20 (commonly referred to as blades). Each row of blades 20 is formed by a plurality of airfoils 20 attached to discs 22 forming a rotor 24. The blades 20 extend radially outward from the discs 22 and terminate in a region known as the blade tip 26. Each row of vanes 18 is formed by attaching a plurality of vanes 18 to a vane carrier 28. The vanes 18 extend radially inwardly from an inner peripheral surface 30 of the vane carrier 28. The vane carrier 28 is attached to an outer casing 32 to form an outer casing structure 34, which encloses the turbine section 16 of the engine 10.

Between the rows of vanes 18, a ring seal assembly 36 can be attached to the inner peripheral surface 30 of the vane carrier 28. The seal assembly 36 is a stationary component that forms a portion of a hot gas path between the rows of vanes 18 at the locations of the rotating blades 20. The seal assembly 36 is commonly formed by a plurality of ring segments attached to the vane carrier 28. Each seal assembly 36 can substantially surround a row of blades 20 such that the tips 26 of the rotating blades 20 are in close proximity to the seal assembly 36. A clearance is usually defined between the tips 26 of the rotating blades 20 and an inner surface of the seal assembly 36. During engine operation, high temperature, high velocity gases flow through the rows of vanes 18 and blades 20 in the turbine section 16. It is desirable to keep the clearance as small as possible to increase engine performance because fluid leakage through the clearance contributes to system losses, decreasing the operational efficiency of the engine. However, it is necessary to maintain a clearance to prevent rubbing between the rotating blades 20 and stationary seal assembly 36 during operation of the engine.

SUMMARY OF THE INVENTION

In accordance with an aspect of the invention, a gas turbine engine is provided including an outer casing and an annular stationary seal structure having an inner surface. A rotor is located inwardly within the seal structure and is rotatable about a rotational axis. The rotor has a plurality of blades, each of the blades has a tip proximate to the inner surface of the seal structure. A measuring assembly is provided disposed on the inner surface of the seal structure. The measuring assembly includes an indicia portion that extends radially inwardly from the inner surface to a location radially inwardly from the tips of the blades. The indicia portion of the measuring assembly includes a section that is abraded by the blades during rotational movement of the rotor to provide a visual indication of a distance between the tips of the blades and the inner surface.

In accordance with another aspect of the invention, a measuring assembly is provided for use in a turbine engine having an outer casing supporting an annular vane carrier, an annular stationary seal structure supported on the vane carrier, and a rotor rotatable about an axis and having a plurality of blades, each blade having a tip proximate to an inner surface of the seal structure. The measuring assembly includes a body member having an outwardly facing side for attachment to the inner surface of the seal structure, and inwardly facing side, opposite the outwardly facing side. The inwardly facing side defines an indicia portion spaced radially inwardly from the inner surface of the seal structure and dimensioned to extend radially inwardly from the tips of the blades when the outwardly facing side is attached to the inner surface of the seal structure.

In accordance with a further aspect of the invention, a method is provided for determining a clearance between an inner surface of an annular seal assembly and tips of blades mounted to a rotor in a gas turbine engine. The annular seal assembly is supported within an outer casing structure of the turbine engine and the outer casing structure includes a lower casing structure half and an upper casing structure half. The method includes providing a measuring assembly on the inner surface of the seal assembly the measuring assembly having a body member extending radially inwardly to a location radially inwardly from the tips of the blades. The method also includes rotating the rotor at a rate to abrade a portion of the body member of the measuring assembly, and the abraded portion is indicative of the clearance. The method also includes inspecting the abraded portion from a location exterior of the outer casing to obtain an indication of the clearance between the inner surface of the annular seal assembly and the tips of the blades.

BRIEF DESCRIPTION OF THE DRAWINGS

While the specification concludes with claims particularly pointing out and distinctly claiming the present invention, it is believed that the present invention will be better understood from the following description in conjunction with the accompanying Drawing Figures, in which like reference numerals identify like elements, and wherein:

DETAILED DESCRIPTION OF THE INVENTION

In the following detailed description of the preferred embodiment, reference is made to the accompanying drawings that form a part hereof, and in which is shown by way of illustration, and not by way of limitation, specific preferred embodiments in which the invention may be practiced. It is to be understood that other embodiments may be utilized and that changes may be made without departing from the spirit and scope of the present invention.

Figure 1:
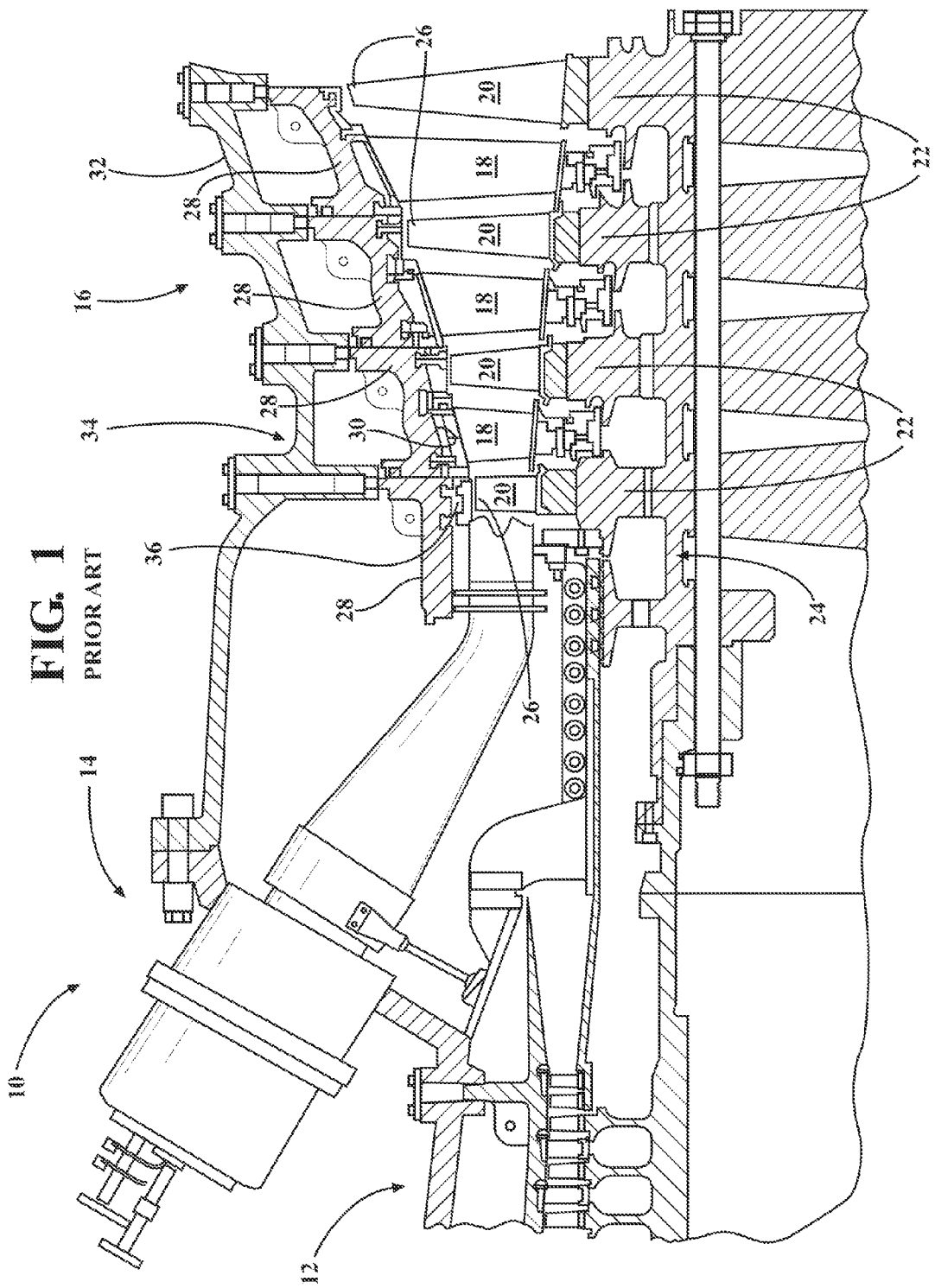
FIG. 1 is a cross-sectional view of a turbine section of a known turbine engine.

As described above with reference to the turbine engine 10 in FIG. 1, it is desirable to maintain a predetermined clearance between blade tips 26 and an inner surface 30 of an annular ring seal assembly 36. Further, in accordance with aspects of the present invention, it is desirable to maintain a predetermined clearance between the blade tips 26 and the seal assembly 36 when the engine 10 is in an assembled condition. That is, it is desirable to ensure that a designed clearance between the blade tips 26 and the seal assembly 36 is maintained when the turbine section 16 of the engine 10 is in an assembled condition.

Figure 2:
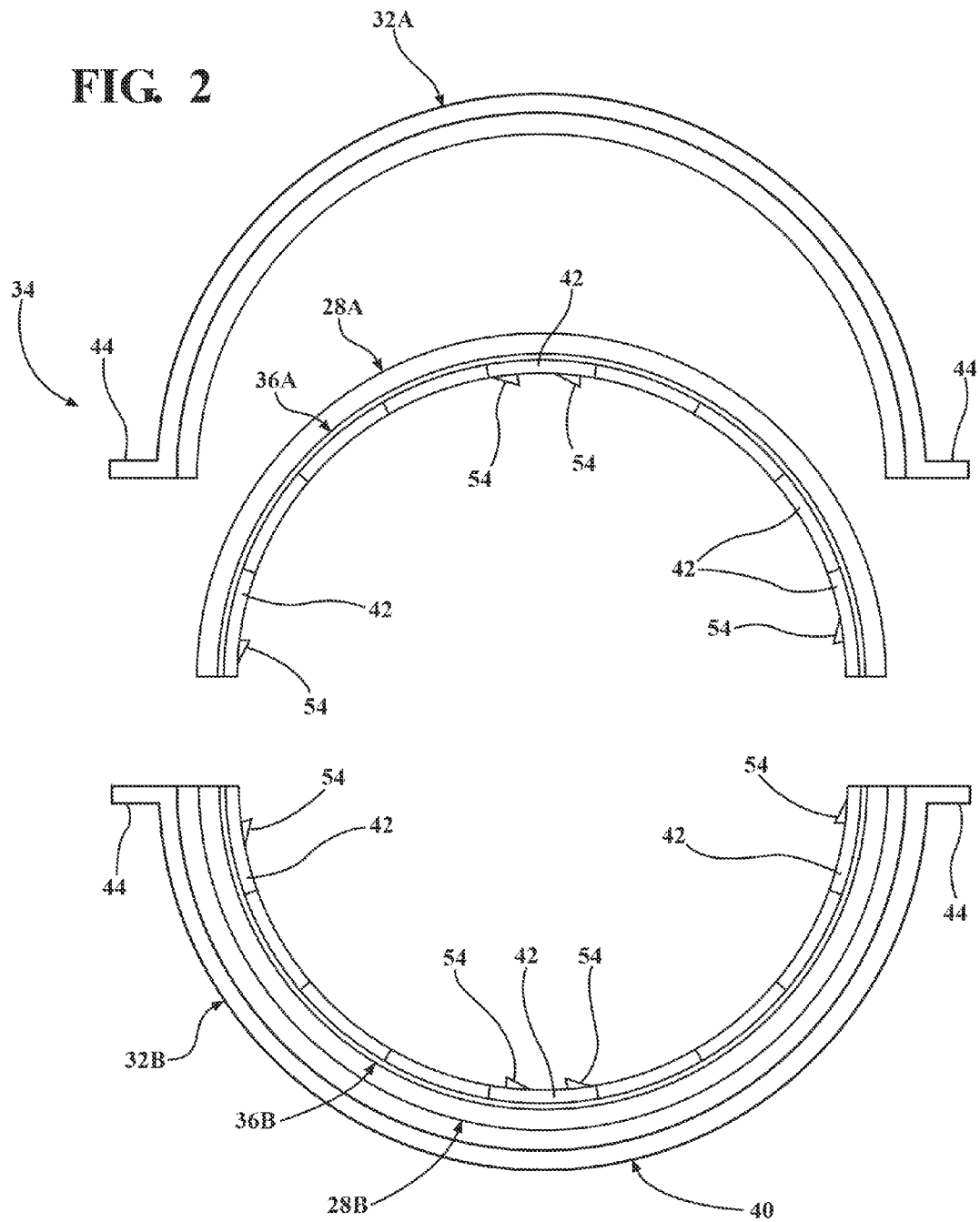
FIG. 2 is a partially exploded diagrammatic end view illustrating a measuring assembly in accordance with the present invention located in an outer casing assembly for the turbine section prior to installation of a rotor.
Figure 3:
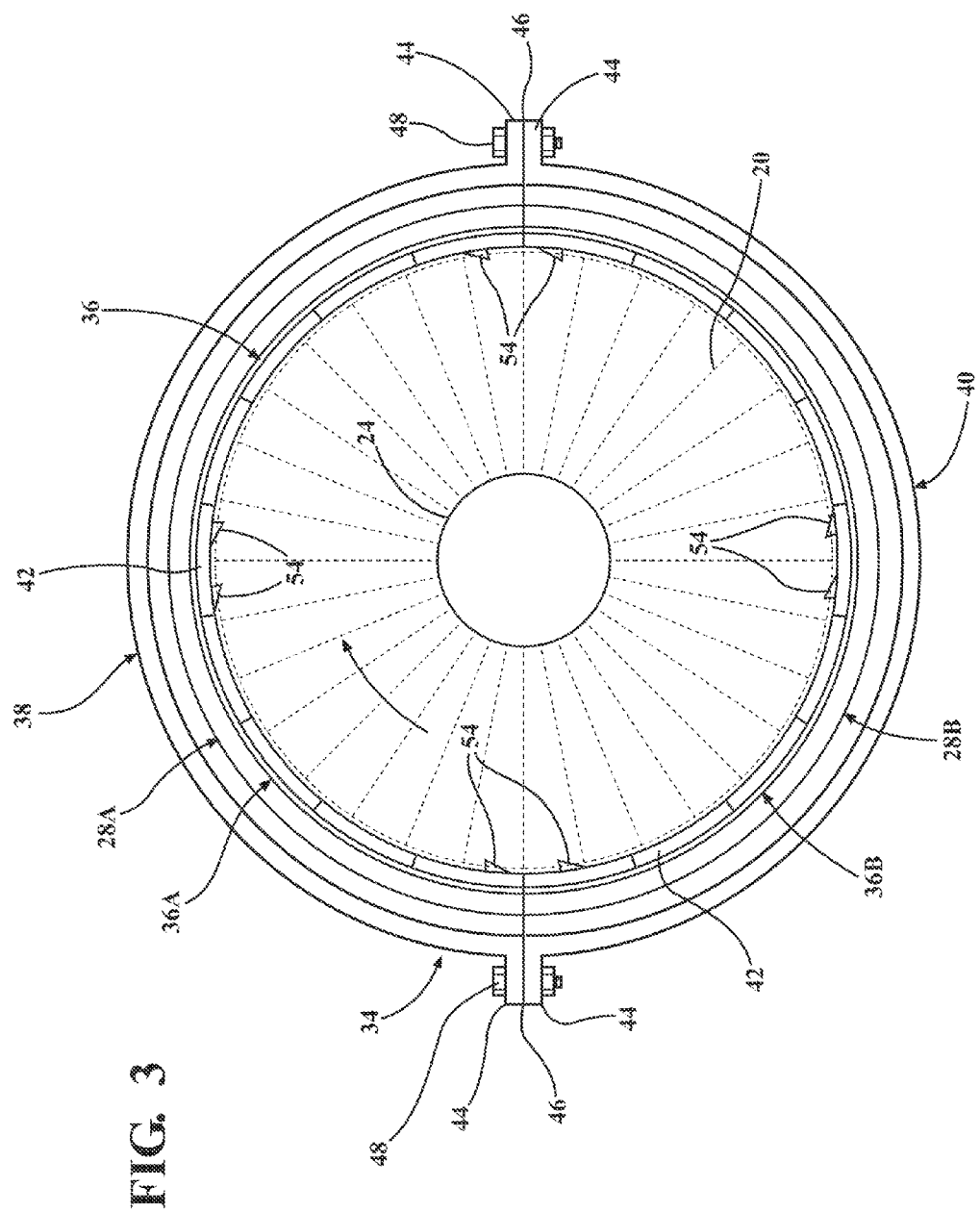
FIG. 3 is a diagrammatic end view of the turbine section illustrating a measuring assembly in accordance with the present invention located in an assembled turbine section.

Referring to FIGS. 2 and 3, it may be seen that the outer casing structure 34 of the turbine section 16 may be formed as an upper casing structure half 38 and a lower casing structure half 40. Each of the casing structure halves 38, 40 may include respective halves of the outer casing 32, the vane carrier 28 and the seal assembly 36. In particular, the outer casing 32 may comprise upper and lower outer casing halves 32A, 32B supporting respective upper and lower halves 28A, 28B of the vane carrier 28. In addition, associated upper and lower halves 36A, 36B of the seal assembly 36 are formed by a plurality of seal segments 42 positioned in side-by-side relation around the inner surface 30 of the vane carrier 28.

The upper and lower casing structure halves 38, 40 may include flanges 44 for connecting the casing structure halves 38, 40 together at horizontal joints 46 (FIG. 3), such as by means of bolts 48 and/or other retaining mechanisms. In accordance with an aspect of the present invention, it should be understood that although the assembled outer casing structure 34 is designed to provide a predetermined clearance between the tips 26 of the blades 20 and inner surfaces 50 of the seal segments 42 forming the seal assembly 36, attachment of the casing structure halves 38, 40 together, such as by the bolts 48, may cause distortions to the outer casing 32 that may alter the clearance between the blade tips 26 and the inner 5. surfaces 50 of the seal segments 42 (hereinafter referred to as tip-to-seal clearance). In addition, variations in the tip-to-seal clearance between a circumferential location at top-dead-center (TDC) and a circumferential location at bottom-dead-center (BDC) may occur as a result of rotor gravity deflection. For example, rotor gravity deflection may cause a larger tip-to-seal clearance for the blades 20 at or near TDC than for the blades 20 at or near BDC.

Figure 4:
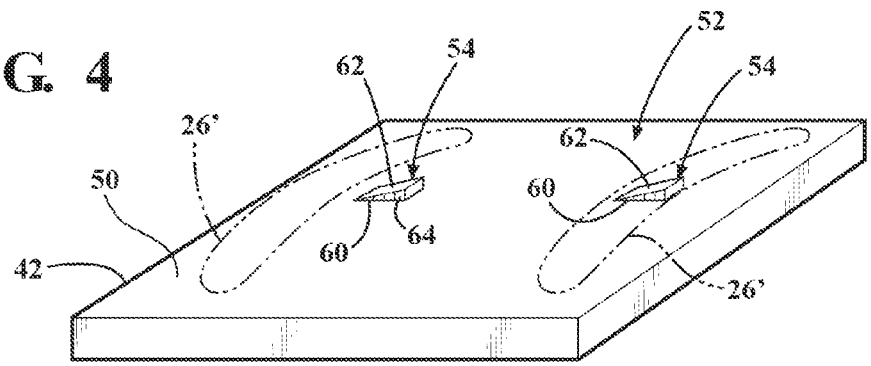
FIG. 4 is a diagrammatic view illustrating a measuring assembly in accordance with the present invention on a seal segment.
Figure 5:
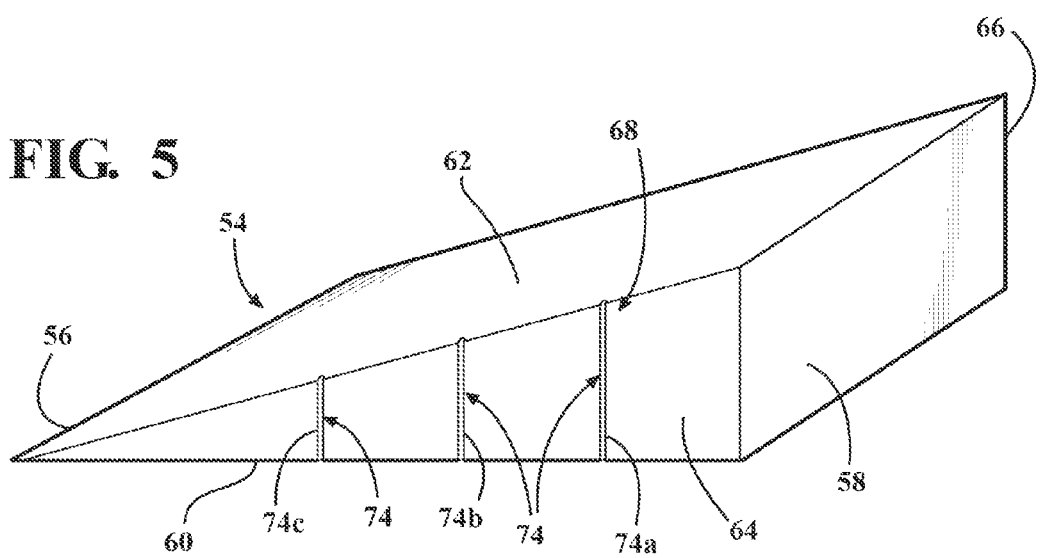
FIGS. 5 and 6 are perspective views of a body member for the seal assembly illustrated in FIG. 4.

Referring to FIGS. 4 and 5, in accordance with a further aspect of the invention, a measuring assembly 52 may be provided comprising, for example, one or more body members 54 that may be affixed to the inner surface 50 of one or more of the seal segments 42. As discussed in greater detail below, the seal assembly 52 is configured to be cut or abraded by at least one of the blade tips 26 to provide an indication of the tip-to-seal clearance after the outer casing structure 34 has been assembled. It may be noted that, for the purposes of the present invention, the terms "cut" and "abrade" or "abraded" are considered to refer to equivalent operations and may be used interchangeably.

As seen in FIG. 5, the body member 54 may comprise a wedge shaped member having a first end 56, a second end 58, an outwardly facing side 60 extending between the first and second ends 56, 58, an inwardly facing side 62 extending between the first and second ends 56, 58 and opposite from the outwardly facing side 60, and a pair of lateral sides 64, 66 extending between the first and second ends 56, 58. The outwardly facing side 60 extends widthwise between the lateral sides 64, 66 and is rigidly affixed to the inner surface 50 of a seal segment 42, such as by means of a strong adhesive, e.g., an epoxy. It may be noted that the reference to "outwardly facing" and "inwardly facing" is relative to the orientation of the body member 54 when it is supported on and extends radially inwardly from the seal segment 42 when mounted in the engine 10, as may be seen, for example, in FIG. 3. The inwardly facing side 62 extends widthwise between the lateral sides 64, 66, and comprises a surface that extends at an angle relative to the inner surface 50 of the seal segment 42. In particular, the inwardly facing side 62 extends progressively radially inwardly from the first end 56 toward the second end 58. In the illustrated embodiment, the inwardly facing side 62 is shown as a continuous ramp surface extending from the first end 56 to the second end 58. However, the inwardly facing side 62 may comprise other configurations including, for example, a discontinuous ramp surface, such as a ramp surface that extends radially inwardly in a stepwise manner.

Figure 6:
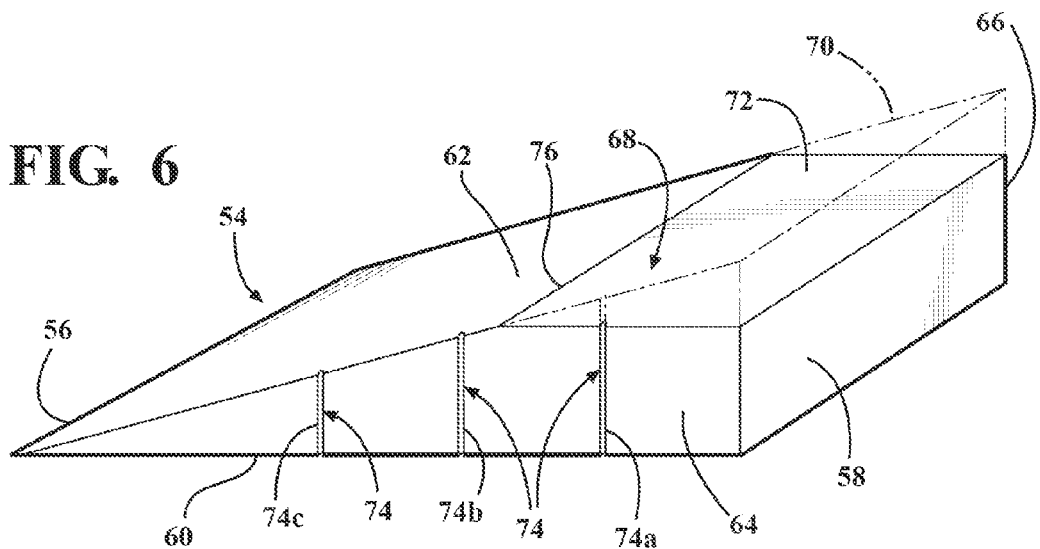
Figure 7:
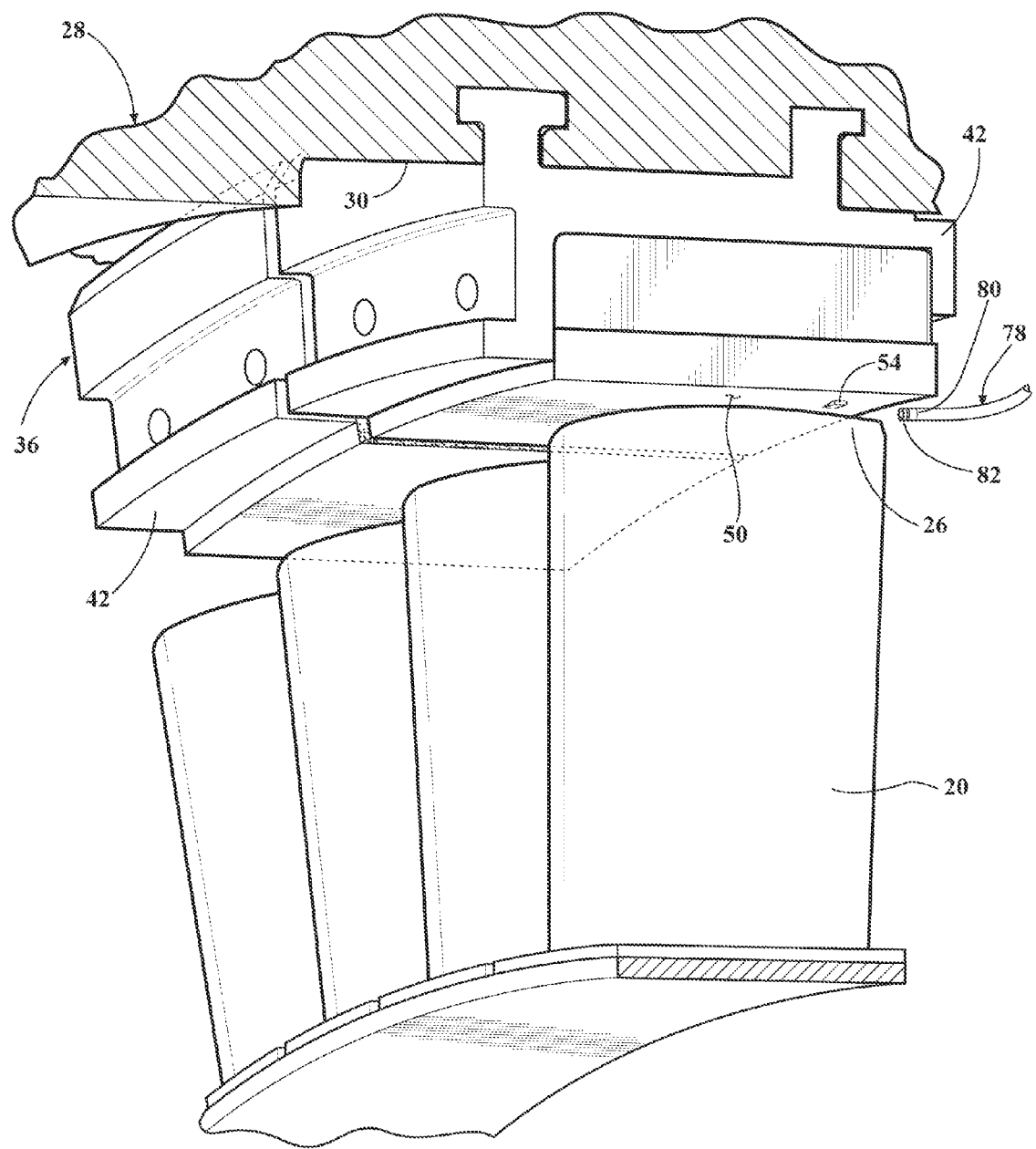
FIG. 7 is a perspective view interior view of a portion of a turbine section illustrating a measuring assembly in accordance with the present invention located to perform a tip-to-seal clearance measuring operation.

The body member 54 defines an indicia portion 68 extending radially inwardly from the inner surface 50 of the seal segment 42 to a location that may be located radially inwardly from the blade tips 26, see FIGS. 3 and 7. As seen in FIG. 6, the indicia portion 68 may include a portion or section 70 that may be abraded or otherwise removed by the blades 20 during a rotational movement of the rotor 24 and blades 20 to provide a visual indication of the tip-to-seal clearance. The body member 54 may function as a distance gage between the inner surface 50 of the seal segment 42 and the blade tips 26 to provide a visual indication of the tip-to-seal clearance, as indicated by a radial extension or distance from the outer surface 60 to a cut or abraded portion 72 comprising a surface formed on the body member 54 when a portion of the inner side 62 is cut or abraded away by the blades 20 during a rotation operation performed on the rotor 24 following assembly of the outer casing structure 34, as is described below. Hence, a distance indicated by the indicia portion 68 may comprise a visually observable portion of the body member 54, e.g., on a lateral side 64, 66 or on the inwardly facing side 62, to provide an observable indication of the distance from the inner surface 50 to the cut or abraded portion 72, which may correspond to the radial location of the blade tips 26.

The body member 54 may be formed of a material that may be readily cut or abraded by relative movement of the blade tips 26 across the body member 54 without causing the body member 54 to crack or otherwise deteriorate beyond the location of the cut or abraded portion 72 directly contacted by the blade tips 26. For example, the body member 54 may preferably be formed of a polyimide material sold under the trademark VESPEL®. VESPEL® is a registered trademark of the E. I. DuPont de Nemours Company, used to describe a polyimide resin available from the E. I. DuPont de Nemours Company. In particular, a body member 54 formed of VESPEL® polyimide resin may be easily machined to accurate dimensions, and provide a durable material that permits the cut or abraded portion 72 to be accurately formed at the location of the blade tips 26 while the remainder of the body portion 54 is substantially undeformed and otherwise unaffected, and further will burn off of the seal segment 42 upon exposure to the hot working gases passing through the turbine section 16, so as to not adversely affect operation of the engine 10.

Referring to FIGS. 5 and 6, in accordance with a further aspect of the invention, the indicia portion 68 may include a plurality of indicia 74, at least some of which extend radially inwardly of the tips 26 of the blades 20 to facilitate a determination of a radial distance of the cut or abraded portion 72 from the inner surface 50. In the illustrated embodiment, the indicia 74 may comprise a plurality of generally parallel line marks or grooves that may provide a visual indication of locations spaced along the body member 54 in a direction from the first end 56 toward the second end 58. That is, the indicia 74 may provide a graduated measurement scale, where the locations of the indicia 74 correspond to predetermined radial measurement locations, i.e., radial distances, from the outwardly facing side 60 to the inwardly facing side 62. In a specific configuration of the body member 54, the distance from the outwardly facing side 60 to the inwardly facing side 62 at the second end 58 may be about 4.0 mm, and the indicia 74 may be spaced at locations along one or both of the lateral sides 64, 66 corresponding to 0.5 mm increments of the radial measurement locations along the ramp surface defined by the inwardly facing side 62. For example, indicia 74a may correspond to a radial measurement location of 3.5 mm, indicia 74b may correspond to a radial measurement location of 3.0 mm, and indicia 74c may correspond to a radial measurement location of 2.5 mm. Hence, the radial distance between the inner surface 50 of the seal segment 42 and the blade tips 26 may be determined by identifying an intersection location 76 (FIG. 6) where the ramp surface defined by the inwardly facing side 62 intersects the cut or abraded portion 72 with reference to the particular indicia 74 that is nearest to the intersection location 76.

The distance from the outwardly facing side 60 to the inwardly facing side 62 at the second end 58 of the body member 54 is selected such that the inwardly facing side 62 extends to a radial location within the turbine section 16 that is radially inwardly from the tips 26 of the blades 20 when the rotor 24 is installed in the turbine section 16. It should be noted that the final installed height, i.e., the radial inward extension, of the body member 54 may include a thickness of an adhesive used to affix the body member to the seal segment 42, such that the radial inward extension may be a combined height of the adhesive thickness and the distance from the outwardly facing side 60 to the inwardly facing side 62.

In order to facilitate observation of the indicia 74 of the measuring assembly 52 located within the engine 10, where the indicia 74 are defined by grooves, the grooves may be painted, or otherwise coated, with a contrasting color relative to the color of the lateral sides 64, 66. Alternatively, the lateral sides 64, 66 may be painted, or otherwise coated, with a contrasting color to the body member 54 prior to forming grooves defining the indicia 74, such that indicia appear with a different or contrasting color relative to the lateral sides 64, 66 upon formation of the grooves.

In a process for determining a tip-to-seal clearance measurement, as depicted in FIGS. 2 and 3, the measuring assembly 52 may be installed as a plurality of the body members 54 attached to the annular ring seal assembly 36 at a plurality of predetermined circumferential locations. The body members 54 are preferably attached to the seal segments 42 of the ring seal assembly 36 such that the first end 56 of the body member 54 is located upstream from the second end 58 of the body member 54, with reference to the direction of rotation of the rotor 24, positioning the inwardly facing side 62 to be initially contacted by a rotating blade 20 as the blade 20 rotates toward the second end 58 of the body member 54.

It should be noted that although the preferred implementation of the measuring assembly 52 is described with reference to a plurality of the body members 54, a form of the present invention may be performed using a single one of the body members 54. The plurality of body members 54 provide measurements at locations where different tip-to-seal clearances may occur around the circumference of the ring seal assembly 36. Further, pairs of the body members 54 may be provided at the same location, i.e. on the same seal segment 42 or on adjacent seal segments 42, to provide a redundant measurement structure in case one of the body members 54 is damaged during installation of the rotor 24 or assembly of the outer casing structure 34.

The plurality of predetermined circumferential measurement locations may be at or near top-dead-center and bottom-dead-center, and at or near each of the locations of the horizontal joints 46. For example, a pair of body members 54 may be affixed to the ring seal assembly 36 at each of the TDC and BDC locations, and body members 54 may be affixed to the seal segments 42 of the upper half 36A of the ring seal assembly 36 adjacent to the locations of the horizontal joints 46 prior to mounting of the rotor 24 and assembly of the upper half 36A to the lower half 36B of the ring seal assembly 36. Subsequent to installation of the rotor 24 and associated blades 20 and prior to assembly of the upper casing structure half 38 to the lower casing structure half 40, body members 54 may be affixed to the seal segments 42 of the lower half 36B of the ring seal assembly 36 adjacent to the locations of the horizontal joints 46. The upper casing structure half 38 may then be positioned on the lower casing structure half 40, and the two casing structure halves 38, 40 may be attached together by the bolts 48.

To determine the tip-to-seal clearance, the rotor 24 may be driven in rotation, such as by a hydraulic motor, or other means, temporarily coupled to the rotor 24. Rotation of the rotor 24 causes the blades 20 to engage and remove, i.e., by cutting or abrading, the section 70 of the indicia portion 68 to define the surface of the cut or abraded portion 72 on the body member 54. It may be noted that the rotor 24 may be rotated at a slow rate of rotation, such as 1 rpm or less, in that the speed of rotation of the rotor 24 is not critical to the cutting or abrading operation resulting from movement of the blades 20 relative to the body members 54. As illustrated in FIG. 7, a flexible inspection instrument, such as a borescope 78, may be inserted through the turbine section 16 to locate an end 80 of the borescope 78 at the location of the measuring assembly 52. The end 80 of the borescope 78 may be provided with a CCD camera 82 to view the body members 54 of the measuring assembly 52 remotely, i.e., at an end of the borescope 78 outside of the engine 10, to determine the location of the particular indicia 74 corresponding to or located near the intersection 76 of the ramped inwardly facing side 62 with the cut or abraded portion 72. Alternatively, other optical structures may be provided to the borescope 78 for viewing the measuring assembly. The borescope 78 may be inserted through the exhaust end of the turbine section 16, or the borescope 78 may be inserted through an inspection opening, such as is typically provided through turbine engine casings. Further, it should be understood that the measuring assembly 52 may be provided to any one of the stages of rotating blades 20 within the turbine section 16, or may be provided to a plurality of the stages of rotating blades 20 and may be inspected by causing the borescope 78 to be guided through the series of vanes 18 and blades 20 forming the stages of the turbine section 16 until the end 80 of the borescope 78 is located at the stage containing the measuring assembly 52.

By viewing the indicia on either of the lateral sides 64, 66 of the body members 54, i.e., as viewed by the borescope 78 in the generally axial direction, the tip-to-seal clearance may be determined at each of the predetermined circumferential measurement locations around the ring seal assembly 36.

Further, a tip-to-seal clearance may also be determined by an alternative measurement system, such as by use of a feeler gage, at the location on the lower ring seal half 36B adjacent to the location of the horizontal joint 46, i.e., subsequent to placement of the rotor 24 within the turbine section 16, to provide a verification or comparison of the tip-to-seal clearance measurement before and after assembly of the outer casing assembly 34.

As noted above, pairs of the body members 54 may be provided at each of the circumferential measurement locations in case one of the body members 54 is damaged during installation of the rotor 24 or assembly of the outer casing assembly 34. For example, as illustrated by phantom lines 26' illustrating the shadow of blade tips 26 on the seal segment 42 in FIG. 4 and corresponding, for example, to the seal segment 42 located at the BDC of the ring seal assembly 36, installation of the rotor 24 into the lower casing structure half 40 may result in one blade tip 26 engaging and possibly damaging one of the body members 54, while an adjacent body member 54 may not be engaged with a blade tip 26. Hence, by appropriate circumferential spacing of the body members 54 at each of the predetermined circumferential measurement locations, it may be possible to substantially ensure that at least one of the pairs of body members 54 is undamaged prior to rotation of the rotor 24 during the measurement operation.

Figure 8:
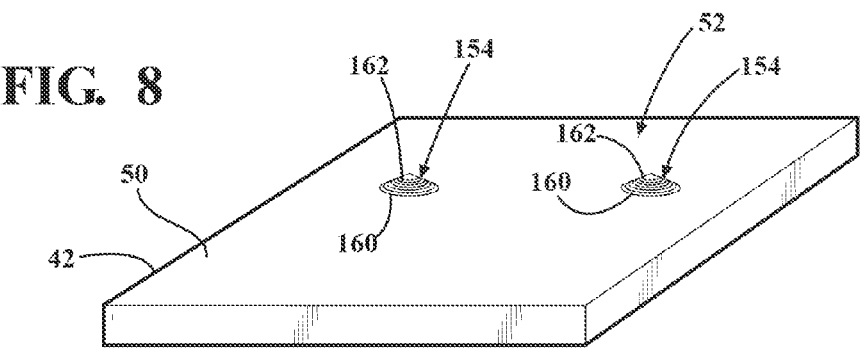
FIG. 8 is a diagrammatic view illustrating a measuring assembly in accordance with the present invention on a seal segment and incorporating a further configuration for a seal member.
Figure 9:
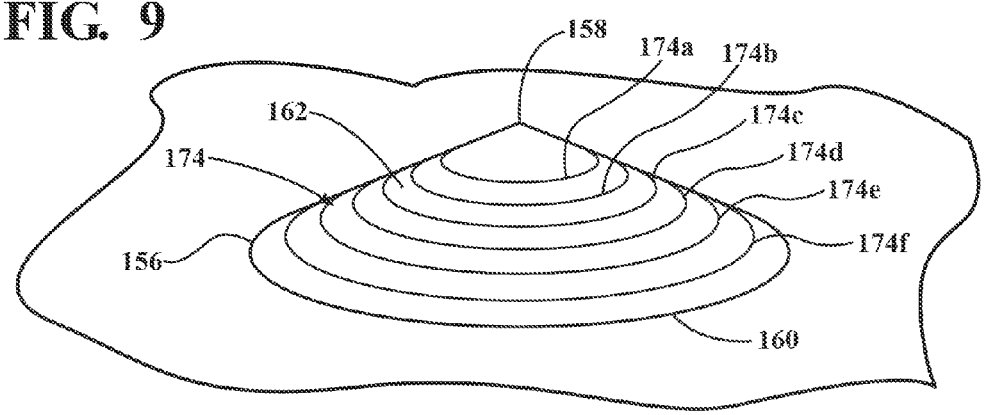
FIGS. 9 and 10 are perspective views of a body member for the seal assembly illustrated in FIG. 8.

Referring to FIGS. 8 and 9, a further configuration for a body member of the measuring assembly 52 is illustrated by a body member 154, where the measuring assembly 52 may comprise one or more of the body members 154 affixed to the inner surface 50 of one or more of the seal segments 42. The body member 154 may be formed of a VESPEL® polyimide resin, and may comprise a generally conical shaped member, e.g., a cone of revolution, having a first end 156, defining a base of the cone, located at an outwardly facing side 160 for rigidly affixing to the inner surface 50 of the seal segment 42, and a second end 158 located at the vertex of the cone defined by the body member 154. It should be understood the generally conical shape of the body member 154 may comprise a frustum of a cone, i.e., with a portion of the cone cut off at the apex, in which case the second end 158 would be located at the outer end of the frustum of the cone.

The outer surface of the body member 154 extending from the first end 156 to the second end 158 comprises an inwardly facing side 162 of the body member 154. The inwardly facing side 162 defines a ramp surface extending at a predetermined angle from the first end 156 toward the second end 158 around the circumference of the body member 154. At least a portion of the body member 154 is located radially inwardly from the tips 26 of the blades 20 at the second end 158 of the body member 154.

Figure 10:
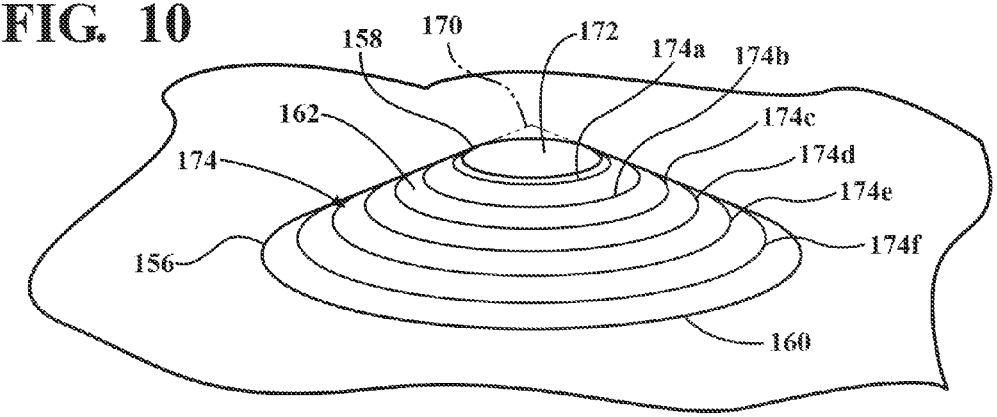

The body member 154 may provide a tip-to-seal clearance measurement in a manner substantially similar to that described above for the seal member 54. In particular, rotation of the rotor 24 and blades 20 may cause an indicia portion 168 comprising a portion or section 170 of the body member 154 to be cut or abraded, as is illustrated in FIG. 10. A cut or abraded portion 172 comprising a surface formed on the body member 154 is defined when a portion of the inwardly facing side 162 is cut or abraded away by the blades 20 during a rotation operation performed on the rotor 24, as described above. The indicia portion 168 may further include a plurality of indicia 174 comprising a plurality of generally parallel line marks or grooves 174a-f formed on the inwardly facing surface 162 and encircling the body member 154 to define a graduated measurement scale. The indicia lines or grooves 174a-f are spaced at predetermined intervals in the direction from the first end 156 toward the second end 158, each indicia 174 corresponding to and providing an indication of a different radial distance radially inwardly from the first end 156. During a tip-to-seal measurement operation, the indicia portion 168 may be cut or abraded by passage of a blade 20, removing any indicia 174 that are located radially inwardly from the tip 26 of the blade 20. Hence, the remaining portion of the body member 154 may be visually observed to determine the remaining indicia 174, providing a visual indication for measurement of the tip-to-seal clearance, such as by use of a borescope 78 (FIG. 7).

It should be noted that the body member 154 provides a configuration wherein the indicia 174 encircling the body member 154 may be observed from any direction relative to the body member 154. Hence, the body member 154 may facilitate observation of the indicia 174 without necessitating locating of the borescope 78 to a particular angular position relative to the body member 154.

Further, it should be understood that other configurations of the body members for the measuring assembly 52 may be provided within the spirit and scope of the invention. For example, the body member may be configured as a pyramid or other shape that may be positioned on the seal segment in a manner which permits a radially extending portion of the body member to extend radially inwardly from the tips 26 of the blades 20 before rotation of the blades 20 to cut or abrade the body member.

Also, although a particular number of indicia 74, 174 have been illustrated on the body members 54, 154, it should be understood that a greater number or fewer indicia may be provided to provide a desired incremental visual indication for determining the tip-to-seal clearance.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A gas turbine engine comprising:
an outer casing;
an annular stationary seal structure supported within said outer casing and having an inner surface;
a rotor located inwardly within said seal structure and rotatable about a rotational axis, said rotor having a plurality of blades, each said blade having a tip proximate to said inner surface of said seal structure;
a measuring assembly having an outwardly facing side and an oppositely facing inwardly facing side, said outwardly facing side affixed to said inner surface of said seal structure such that said measuring assembly extends outwardly no further than said inner surface of said seal structure, said measuring assembly comprising an indicia portion that extends radially inwardly from said inner surface to a location radially inwardly from said tips of said blades, said indicia portion of said measuring assembly comprising a section that is visible on an outer surface of said measuring assembly and that is abraded by said blades during rotational movement of said rotor to provide a visual indication of a distance between said tips of said blades and said inner surface.

2. The gas turbine engine according to claim 1, wherein said indicia portion comprises said inwardly facing side of said measuring assembly spaced from said inner surface of said seal structure, and including a plurality of indicia corresponding to a plurality of radially spaced locations on said inwardly facing side, said indicia providing said visual indication of said distance between said tips of said blades and said inner surface.

3. The gas turbine engine according to claim 2, wherein said measuring assembly includes a first end and a second end radially spaced from said first end in a radial direction from said inner surface toward said rotor, and said indicia comprise a plurality of indicia located in spaced relation to each other in a direction from said first end to said second end and corresponding to a plurality of measurement locations on said inwardly facing side.

4. The gas turbine engine according to claim 3, wherein said inwardly facing side extends at an angle relative to said inner surface.

5. The gas turbine engine according to claim 4, wherein said inwardly facing side comprises a ramp surface extending radially inwardly from said first end toward said second end and including at least one lateral side extending from said first end to said second end, and said indicia comprise a plurality of generally parallel line marks defining a graduated measurement scale formed on said lateral side.

6. The gas turbine engine according to claim 5, wherein said line marks extend to different radial locations at said inwardly facing side of said measuring assembly.

7. The gas turbine engine according to claim 5, wherein said measuring assembly comprises a wedge shaped body member.

8. The gas turbine engine according to claim 3, wherein said measuring assembly comprises a conical body member including a base at said first end affixed to said inner surface of said seal member, and a tip located at said second end and located radially inwardly from said first end.

9. The gas turbine engine according to claim 8, wherein said indicia comprise a plurality of generally parallel line marks extending around said inwardly facing side to define a graduated measurement scale.

10. The gas turbine engine according to claim 2, wherein said measuring assembly comprises a pair of body members, each said body member comprising said plurality of indicia, and said pair of body members located in circumferentially spaced relation to each other.

11. The gas turbine engine according to claim 1, wherein said outer casing and said annular stationary seal structure comprise upper half and a lower halves, said upper and lower halves being connected by horizontal joints, and said measuring assembly is located adjacent at least one of said horizontal joints.

12. A measuring assembly for use in a turbine engine comprising an outer casing supporting an annular vane carrier, an annular stationary seal structure supported on the vane carrier, and a rotor rotatable about an axis and having a plurality of blades, each blade having a tip proximate to an inner surface of the seal structure, said measuring assembly comprising:
    a body member having an outwardly facing side affixed to said inner surface of said seal structure; and
    said body member having an inwardly facing side, opposite said outwardly facing side, said inwardly facing side defining an indicia portion that is visible on an outer surface of said body member, and the indicia portion is spaced radially inwardly from said inner surface of said seal structure and dimensioned to extend radially inwardly from said tips of said blades when said outwardly facing side is attached to said inner surface of said seal structure.

13. The measuring assembly according to claim 12, wherein said inwardly facing side extends at an angle relative to said inner surface.

14. The measuring assembly according to claim 13, wherein said body member includes a first end and a second end, and said indicia portion comprises a plurality of indicia spaced along said body member from said first end to said second end and corresponding to a plurality of measurement locations on said inwardly facing side.

15. The measuring assembly according to claim 14, wherein body member comprises a wedge shape having a ramp surface defining said inwardly facing side and including a lateral surface extending radially between said ramp surface and said outwardly facing side, and said indicia comprise generally parallel line marks located on said lateral surface.

16. The measuring assembly according to claim 14, wherein said body member comprises a conical shape having a base defining said outwardly facing side, and said indicia comprise generally parallel line marks defined on said inwardly facing side extending around said body member.

17. A method of determining a clearance between an inner surface of an annular seal assembly and tips of blades mounted to a rotor in a gas turbine engine, said annular seal assembly supported within an outer casing structure of the turbine engine and said outer casing structure comprising a lower casing structure half and an upper casing structure half, the method comprising:
    providing a measuring assembly affixed on an inner surface of said seal assembly, said measuring assembly including a body member extending radially inwardly to a location radially inwardly from said tips of said blades;
    rotating said rotor at a rate to abrade a portion of said body member of said measuring assembly, said abraded portion being indicative of said clearance;
    visually inspecting said abraded portion from a location exterior of said outer casing to obtain an indication of said clearance between said inner surface of said annular seal assembly and said tips of said blades; and
    wherein said body member includes indicia on an outer surface thereof defining a graduated scale, and said visually inspecting an abraded portion comprises identifying a measurement location of said abraded portion relative to said graduated scale with said body member in position extending inwardly from said inner surface, said measurement location corresponding to a distance of said abraded portion from said inner surface.

18. The method according to claim 17, wherein said upper casing structure half is engaged on said lower casing structure half during said step of inspecting, and said step of inspecting comprises inserting a borescope through said outer casing structure to view said abraded portion.

* * * * *